United States Patent
Yun et al.

(10) Patent No.: US 12,110,721 B2
(45) Date of Patent: Oct. 8, 2024

(54) DOOR HINGE DEVICE FOR VEHICLES

(71) Applicants: HYUNDAI MOTOR COMPANY, Seoul (KR); Kia Corporation, Seoul (KR)

(72) Inventors: Hyungin Yun, Seoul (KR); Chungsik Yim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 109 days.

(21) Appl. No.: 17/948,646

(22) Filed: Sep. 20, 2022

(65) Prior Publication Data

US 2023/0203863 A1 Jun. 29, 2023

(30) Foreign Application Priority Data

Dec. 27, 2021 (KR) .......................... 10-2021-0188087

(51) Int. Cl.
*B60J 5/04* (2006.01)
*E05D 3/18* (2006.01)

(52) U.S. Cl.
CPC .............. *E05D 3/18* (2013.01); *B60J 5/0479* (2013.01); *B60J 2005/0475* (2013.01); *E05Y 2900/531* (2013.01)

(58) Field of Classification Search
None
See application file for complete search history.

(56) References Cited

U.S. PATENT DOCUMENTS

| 7,798,557 B2 * | 9/2010 | Elliott | B60J 5/06 296/146.12 |
| 10,443,282 B2 * | 10/2019 | Bauer | E05D 15/1047 |
| 2009/0000200 A1 * | 1/2009 | Heuel | B60J 5/062 296/202 |

FOREIGN PATENT DOCUMENTS

| EP | 3315699 A1 * | 5/2018 | ............. B60J 5/047 |
| KR | 10-2019-0028966 A | 3/2019 | |
| WO | WO-2020097662 A1 * | 5/2020 | ............ B60J 5/0477 |

\* cited by examiner

*Primary Examiner* — Joseph D. Pape
(74) *Attorney, Agent, or Firm* — MORGAN, LEWIS & BOCKIUS LLP

(57) ABSTRACT

A door hinge device for a vehicle is disclosed. In the door hinge device for the vehicle according to an embodiment of the present disclosure, in the vehicle without the B pillar, as the hinge slider connected to the hinge part of the door slides and moves in the outer diagonal direction of the vehicle body along the rails inside the case to secure the rotation trajectory of the door, and then the slide latch part configured in the hinge slider restrains the striker fixed to the case by the linked operation of the link arm connected to the door hinge bracket, thereby the slide movement position of the hinge slider is fixed, and then the opening/closing operation of the door is stably achieved.

8 Claims, 11 Drawing Sheets

DOOR HINGE DEVICE FOR VEHICLES

This application claims priority to and the benefit of Korean Patent Application No. 10-2021-0188087 filed in the Korean Intellectual Property Office on Dec. 27, 2021, the entire contents of which are incorporated herein by reference.

TECHNICAL FIELD

The present disclosure relates to a door hinge device for a vehicle. More particularly, the present disclosure relates to a door hinge device for a vehicle that enables an opening and closing operation of each door independently by securing a rotation trajectory by pushing a hinge part of a door to an outside of a vehicle body in a vehicle without a B pillar.

BACKGROUND

In general, a vehicle door as a door that separates the inside and outside of the vehicle blocks external noise, rain, dust, wind, etc., and has an important function of absorbing an impact together with the side structure to safely protect occupants in an event of a side collision.

There are various types of vehicle doors, including special-purpose doors, but swing doors of a hinge-type are most often applied to passenger vehicles.

In general, the swing door refers to a door that opens to the outside of the vehicle body around a hinge axis installed to the vehicle body through a hinge bracket interposed therebetween, and has advantages of easy opening and closing and a simple structure, so maintenance and repair are easy.

On the other hand, in some vehicles, when the door is opened, an open feeling is large, and an opposing swing door is applied, which is advantageous for getting the passengers on and off.

These opposing swing doors are divided into a type without a B pillar and a type with a B pillar.

FIG. 1 is a side view showing a vehicle to which an opposing swing door according to an example of conventional art is applied, FIG. 2 is a cross-sectional view showing a part where a front door and a rear door are in contact in the vehicle of FIG. 1.

First, referring to FIG. 1 and FIG. 2, an example of the opposing swing door applied to the vehicle 100 without the B pillar is shown. In the front door 110, the hinge part is installed at the front end of the front door 110, and in the rear door 120, the hinge part is installed at the rear end of the rear door 120.

In this opposing swing door, a latch part LC is installed on one side of the front door 110 or the rear door 120 to maintain the locked state.

In addition, a seal S for air-tightness is installed between the rear end of the front door 110 and the front end of the rear door 120.

As described above, the opposing swing door of the vehicle 100 without the B pillar has a good open feeling when riding or leaving the vehicle or leisure activities, however during the opening and closing operation of the front door 110 and the rear door 120, there is a drawback in that the opening and closing order is predetermined, such as having to open or close the front door 110 first or later due to the overlapping rotation trajectory between the front door 110 and the rear door 120.

As such, since the opening and closing order of the front door 110 and the rear door 120 is predetermined, there is a problem that the rear door 120 cannot be opened or closed alone.

FIG. 3 is a side view showing a vehicle to which an opposing swing door according to another example of a conventional art is applied, and FIG. 4 is a cross-sectional view showing a part where a front door and a rear door are in contact with each other in a vehicle of FIG. 3.

Referring to FIG. 3 and FIG. 4, an example of the opposing swing door applied to the vehicle 200 with the B pillar 230 is shown. Also, in the front door 210, a hinge part is installed to the front end of the front door 210, and the hinge part is installed to the rear end of the rear door 220 in the rear door 220.

In this opposing swing door, a latch part LC is installed between each one side of the front door 210 and the rear door 220, and the B pillar 230 to maintain the locking state.

In addition, a seal S for air-tightness is installed between the rear end of the front door 210 and the front end of the rear door 220, corresponding to the B pillar 230, and the B pillar 230.

As such, since the opposing swing door of the vehicle 100 with the B pillar is configured such that the front door 210 and the rear door 220 rotate with respect to the B pillar 230, each of the independent operation of the opening and closing is possible, which has the advantage of a free operation order, however due to the application of the B pillar 230, there is a problem that the feeling of the openness is reduced when riding or leaving the vehicle or the leisure activities.

As such, there is a difference in the sense of the openness of the opposing swing door and there is a difference in the opening and closing operation of the front door and the rear door depending on the presence or absence of the B pillar.

On the other hand, as described above, in order to solve the problem of the operation sequence of the front door 110 and the rear door 120 while maintaining the open feeling of the vehicle 100 without the B pillar, conventionally, as the door hinge device of the opposing swing door, there is an example in which the hinge device of a gooseneck type is applied, however the hinge device of this gooseneck type requires a lot of free space in the vehicle body width direction due to its shape characteristic, so it is difficult to configure the vehicle body layout.

Accordingly, in order to apply the opposing swing door to the vehicle without the B pillar, a door hinge device for realizing a new opening and closing structure is required.

Prior Art Document: (Patent Document 1) KR Patent Laid-Open Publication No. 2019-0028966 (Publication Date: 2019 Mar. 20)

The above information disclosed in this Background section is only for enhancement of understanding of the background of the disclosure, and therefore it may contain information that does not form the prior art that is already known in this country to a person of ordinary skill in the art.

SUMMARY

An embodiment of the present disclosure is to provide a door hinge device for a vehicle in which a hinge slider connected to a hinge part of a door slides and moves in an outer diagonal direction of a vehicle body along rails inside a case in a vehicle without a B pillar to secure a rotation trajectory of the door, and then a slide latch part configured in the hinge slider restrains a striker fixed to the case by a linked operation of a link arm connected to a door hinge bracket, thereby the slide movement position of the hinge slider is fixed, and then the opening/closing operation of the door is stably achieved.

In one or a plurality of embodiments of the present disclosure, a door hinge device for a vehicle including a case installed on one side of a vehicle body corresponding to one end of a door in an outer diagonal direction toward the outside of the vehicle body, a rail configured in a length direction on an upper and lower sides of the case, respectively, and a hinge slider connected through hinge shafts to a door hinge bracket fixed to the one end of the door in a slidably installed state along the rail inside the case, includes: a striker installed on one side of the inside of the case; a slide latch part installed on one side of the hinge slider inside the case and constraining or releasing the striker through a claw lever and a pawl lever at a position where the hinge slider slides in the outer diagonal direction of the vehicle body; and a link arm having one end hingedly connected to the door hinge bracket and a pawl rod being guided along the guide hole formed in the hinge slider at a front end of the link arm to form a pawl rod acting on the pawl lever.

The door is a front door or a rear door. The one end of the door may be formed of a front end of the front door or a rear end of the rear door.

The case includes an inner case facing inside of the vehicle and an outer case facing outside of the vehicle. The striker may be fixed to one side of the inner case inside the case so that the hinge slider slides in the outer diagonal direction of the vehicle body and is constrained to the claw lever.

The slide latch part may include: first, second, and third shafts installed between a fixing plate formed on the hinge slider and a bottom part protruding from the hinge slider; a claw lever including a restraining groove formed for restraining the striker on one side of the claw lever and a supporting surface formed for limiting one direction rotation on the other side of the claw lever, and rotatably installed on the first shaft; a pawl lever including a supporting end on one side thereof acting on the supporting surface and an operating end protruding from the other side and rotatably installed on the second shaft corresponding to one side direction of the claw lever, the operating end is acted by a pawl rod of the link arm; and a claw damper installed on the third shaft corresponding to the other side of the claw lever to limit one direction rotation of the claw lever.

The slide latch part may further include: a claw spring inserted into the first shaft and elastically supporting the claw lever in a rotating direction to release the striker; and a pawl spring inserted into the second shaft and elastically supporting the pawl lever in a rotating direction where the supporting end of the pawl lever supports the supporting surface of the claw lever.

The hinge slider may include: an inner hinge slider of which upper and lower sides are slidably connected along the rail through slider inside the case, respectively, and the slide latch part is installed on the lower side of the inner hinge slider; an upper outer hinge bar integrally connected to the upper side of the inner hinge slider through an upper guide slot formed on an exterior surface of the case outside the case; and a lower outer hinge bar integrally connected to the lower one side of the inner hinge slider through a lower guide slot formed on the exterior surface of the case outside the case, and including a guide hole guiding the pawl rod along a length direction.

The door hinge bracket may include: an upper door hinge bracket fixed to an upper side of the one end of the door and hinge-connected to a front of the upper outer hinge bar through a first hinge shaft of the hinge shafts; and a lower door hinge bracket fixed to a lower side of the one end of the door and hinge-connected to a front of the lower outer hinge bar through a second hinge shaft of the hinge shafts.

The link arm may be disposed under the lower outer hinge bar, the one end of the link arm is hinge-connected to the front of the lower door hinge bracket and the link arm includes a front end to which the pawl rod is slidably installed along the guide hole.

In the door hinge device for the vehicle according to an embodiment of the present disclosure, in the vehicle without the B pillar, in the state that the hinge slider is connected to the hinge part of the door slides and moves in the outer diagonal direction of the vehicle body along the rails to secure the rotation trajectory of the door, the slide latch part configured in the hinge slider restrains the striker fixed to the case by the linked operation of the link arm connected to the door hinge bracket, thereby the slide movement position of the hinge slider may be fixed.

Accordingly, it is possible to simultaneously open/close both doors or independently open/close one door.

In addition, after the hinge part of the door slides and moves in the outer diagonal direction of the vehicle body, the slide movement position of the hinge slider may be maintained with the fixed state by restraining the striker through the slide latch part, thereby the door opening/closing operation by the swing operation may be stably achieved.

The door hinge device for the vehicle according to an embodiment of the present disclosure, in an opposing swing door of the vehicle without the B pillar, maintains the advantage of a good open feeling when the occupant gets on or off, or does leisure activities, and has an effect of not being affected by a door opening/closing sequence even during the opening/closing operation of each door.

In addition, since the user manually opens and closes the door without a separate driving unit using a motor, there is an advantage of enabling the door opening/closing operation even when the battery is discharged.

In addition, the door hinge device for the vehicle according to an embodiment of the present disclosure uses a driving unit such as a conventional motor or is slim compared to a gooseneck type of hinge device, a free space according to an operation radius is unnecessary, there is an advantage that there is room for a vehicle body layout configuration.

DETAILED DESCRIPTION OF THE EMBODIMENTS

Figure 1:
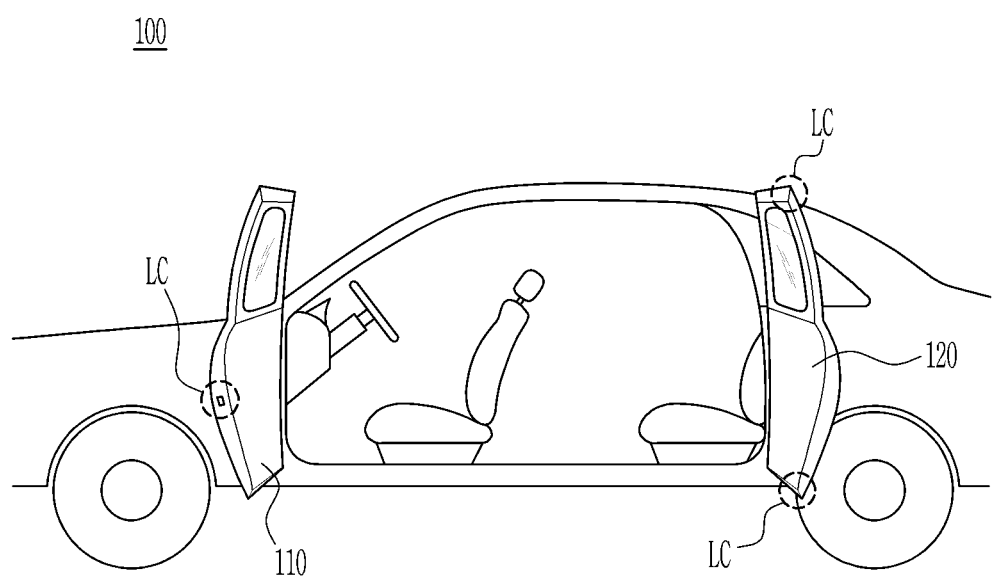
FIG. 1 is a side view showing a vehicle to which an opposing swing door according to an example of conventional art is applied.
Figure 2:
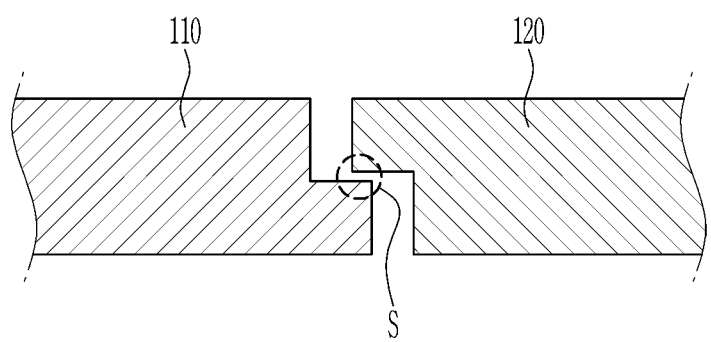
FIG. 2 a cross-sectional view showing a part where a front door and a rear door are in contact in the vehicle of FIG. 1.
Figure 3:
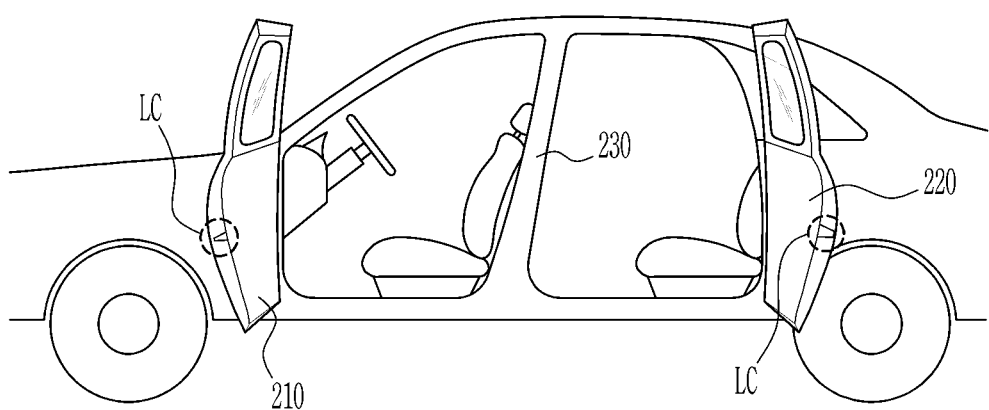
FIG. 3 is a side view showing a vehicle to which an opposing swing door according to another example of a conventional art is applied.
Figure 4:
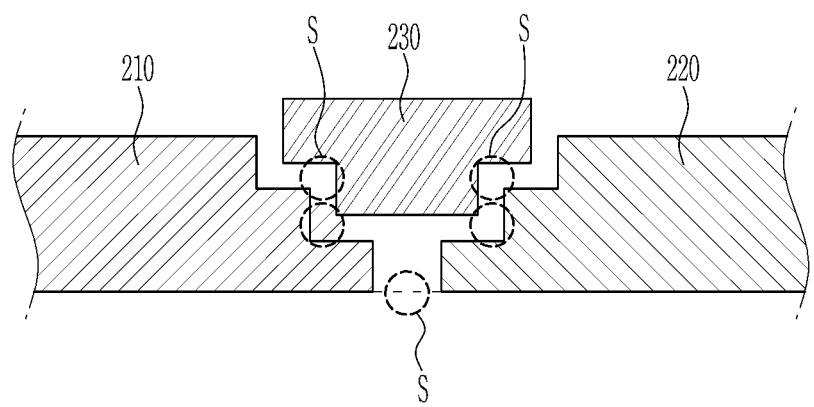
FIG. 4 is a cross-sectional view showing a part where a front door and a rear door are in contact with each other in a vehicle of FIG. 3.

Hereinafter, an embodiment of the present disclosure will be described in detail with reference to the accompanying drawings.

However, since the size and thickness of each component shown in the drawing are arbitrarily indicated for convenience of explanation, the present disclosure is not necessarily limited to be shown in the drawing, and the thickness is enlarged or reduced in order to clearly express various parts and regions. In addition, in order to clearly describe an embodiment of the present disclosure, parts that are irrelevant to the description are omitted.

Figure 5:
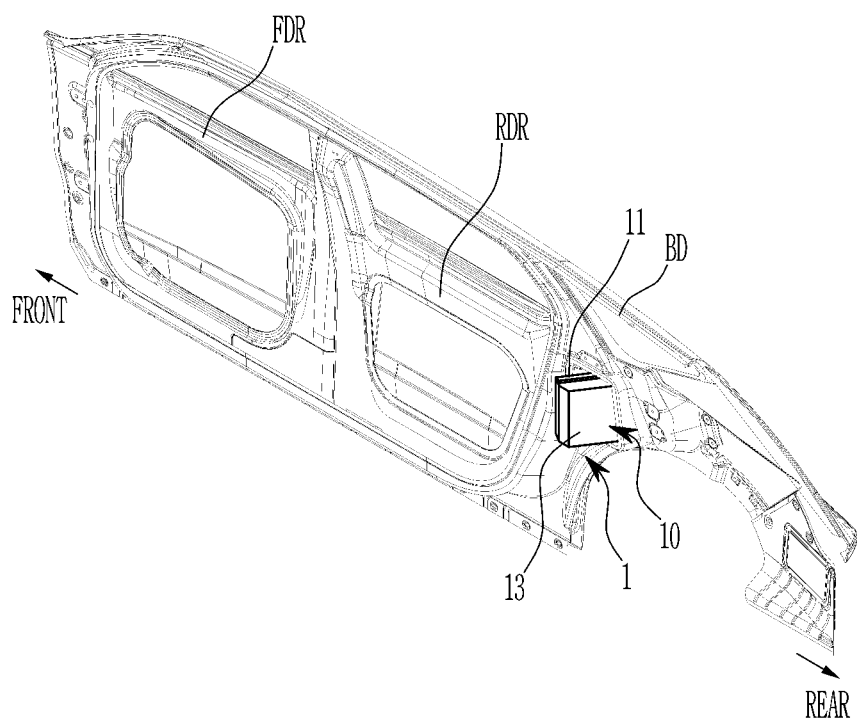
FIG. 5 is an inside perspective view of a vehicle door to which a door hinge device for a vehicle according to an embodiment of the present disclosure is applied.

In describing an embodiment of the present disclosure, for convenience of explanation, an upper left direction in FIG. 5 is defined as the front, and the lower right direction is defined as the rear. In addition, an example in which a door hinge device for a vehicle according to an embodiment of the present disclosure is applied to a rear door of a rear of a passenger seat is described. The door hinge device according to an exemplary embodiment of the present disclosure is a hardware device.

Figure 6:
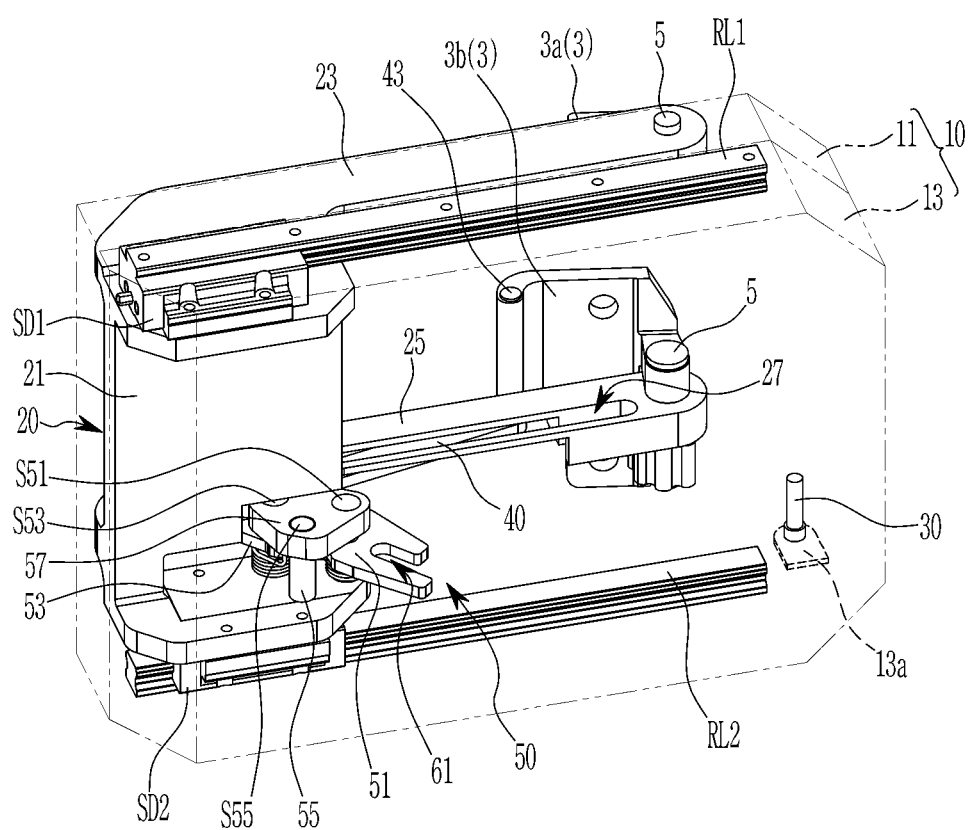
FIG. 6 and FIG. 7 are perspective views projecting a case of a door hinge device for a vehicle according to an embodiment of the present disclosure.
Figure 7:
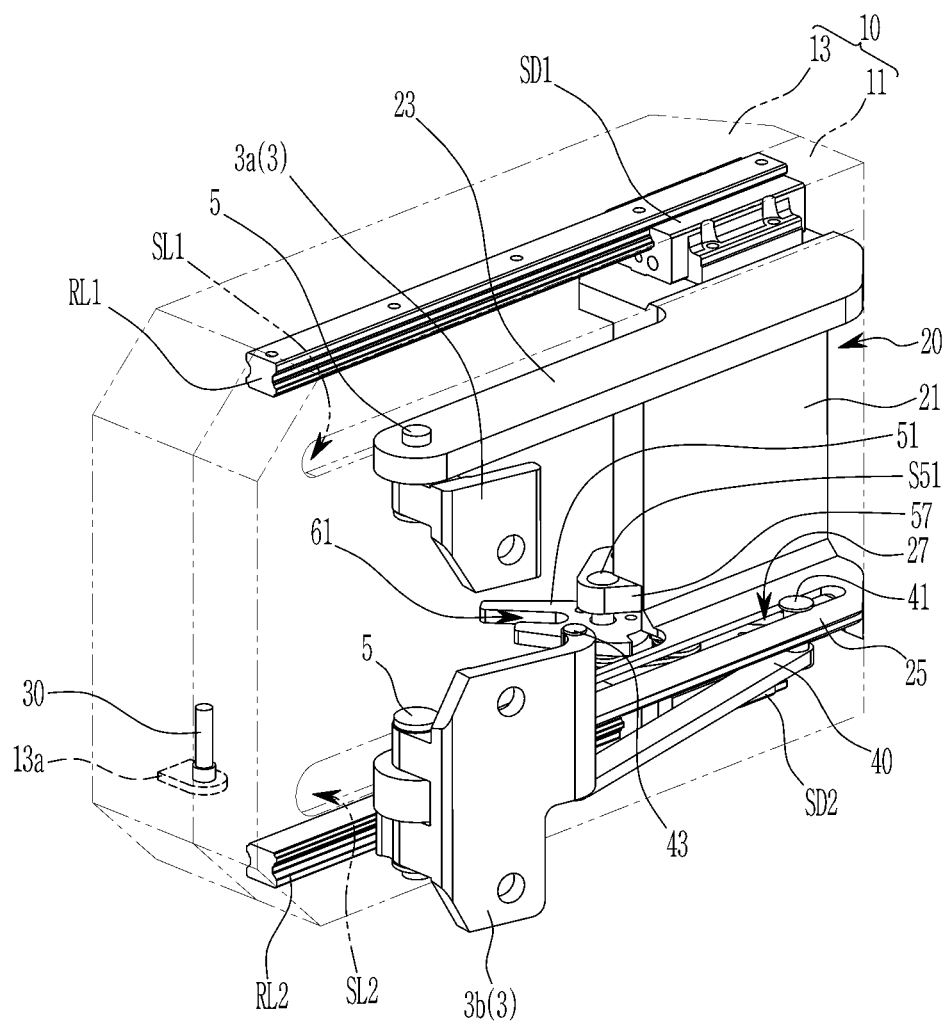
Figure 8:
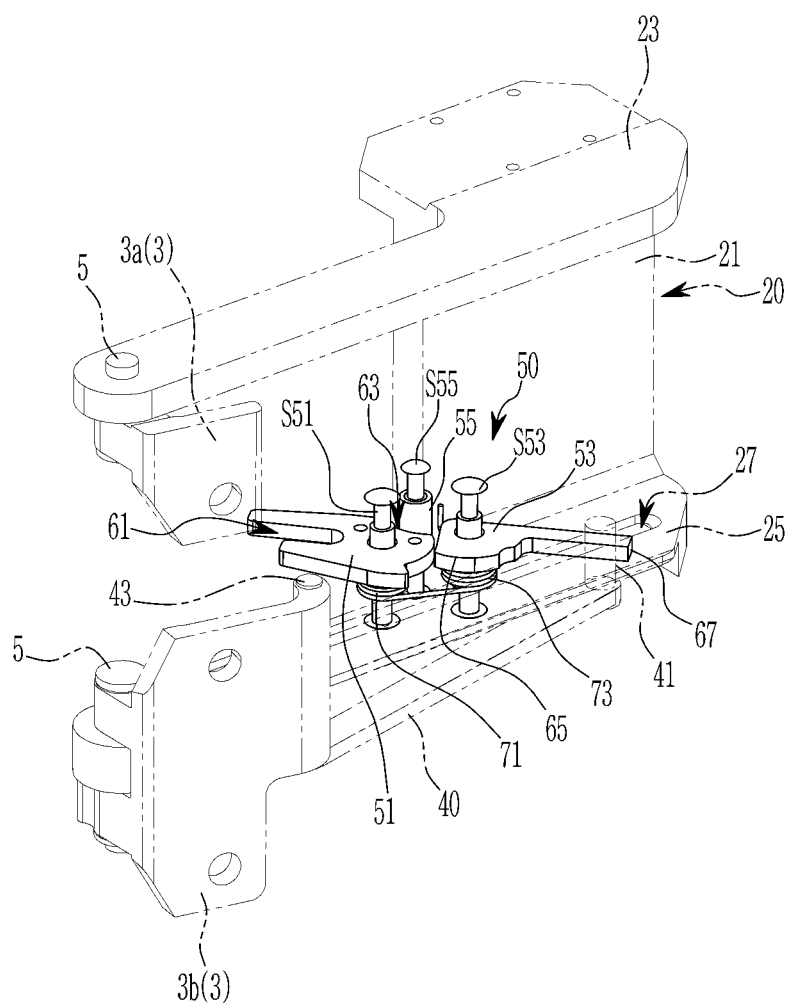
FIG. 8 is a perspective view of a slide latch part projecting a hinge slider applied to a door hinge device for a vehicle according to an embodiment of the present disclosure.

FIG. 5 is an inside perspective view of a vehicle door to which a door hinge device for a vehicle according to an embodiment of the present disclosure is applied, FIG. 6 and FIG. 7 are perspective views projecting a case of a door hinge device for a vehicle according to an embodiment of the present disclosure, and FIG. 8 is a perspective view of a slide latch part projecting a hinge slider applied to a door hinge device for a vehicle according to an embodiment of the present disclosure.

The door hinge device for the vehicle 1 according to an embodiment of the present disclosure is described as an example applied to the rear door of the rear of the passenger seat of the passenger vehicle without a B pillar, however it is not limited thereto, and it may be applied between the front door FDR and the vehicle body BD on both sides of the passenger vehicle without a B pillar, and between the rear door RDR and the vehicle body BD on both sides.

That is, during the opening/closing operation of the door, while the front door FDR or the rear door RDR moves to the outside of the vehicle body BD in each diagonal direction of the front of the vehicle body BD or the rear of the vehicle body BD to secure the rotation trajectory of each door, it enables the simultaneous opening/closing operation of both doors or independently for the opening/closing operation of one door.

Referring to FIG. 5 to FIG. 8, a door hinge device for a vehicle 1 according to an embodiment of the present disclosure may include a case 10, a hinge slider 20, a striker 30, a slide latch part 50, and a link arm 40.

The case 10 is installed in a diagonal direction toward the outside of the vehicle body on one side of the vehicle body BD corresponding to one end of the door DR.

Here, the door DR may be a front door FDR or a rear door RDR, and may refer to them simultaneously. That is, in the case of the front door FDR, one end may be one side of the front end of the front door FDR, and in the case of the rear door RDR, one end may be one side of the rear end of the rear door RDR.

And one side of the vehicle body BD to which the front door FDR is installed means one side of the front of the vehicle body BD, and in this case, the front door FDR may be installed in the diagonal direction toward the front outside of the vehicle body BD.

In addition, one side of the vehicle body BD on which the rear door RDR is installed means one side of the rear of the vehicle body BD, and in this case, the rear door RDR may be installed in a diagonal direction toward the rear outside of the vehicle body BD.

In addition, in the case 10, two guide slots SL1 and SL2 are formed on the exterior surface, and an upper rail RL1 and a lower rail RL2 are installed along the length direction on the upper and lower sides of the interior, respectively.

That is, the case 10 is formed by assembling the outer case 11 and the inner case 13 together.

The outer case 11 faces the outside of the vehicle body BD, and the upper guide slot SL1 and the lower guide slot SL2 are formed parallel to each other by cutting the upper and lower portions on the cross-section along the length direction, respectively.

The inner case 13 faces the inside of the vehicle body BD, and is assembled with the outer case 11.

Also, the upper rail SL1 is disposed along the inner coupling part of the outer case 11 and the inner case 13 in the length direction to be fixed to the inner upper surface, and the lower rail SL2 is disposed along the inner coupling part of the outer case 11 and the inner case 13 in the length direction to be fixed to the inner lower surface.

Also, between the outer case 11 and the inner case 13, the hinge slider 20 is installed through the upper rail RL1 and the lower rail RL2, and the striker 30 is installed on the inner cross-section of the inner case 13.

Also, on the inside between the outer case 11 and the inner case 13, the slide latch part 50 is installed on the lower one side of the hinge slider 20.

The hinge slider 20 is slidably installed along the upper rail RL1 and the lower rail RL2 through two sliders SD1 and SD2 inside the case 10 and is connected to the door hinge bracket 3 fixed to one end of the door DR outside the case 10 through two guide slots SL1 and SL2 through a hinge shaft 5.

That is, the hinge slider 20 is composed of an inner hinge slider 21 positioned inside the case 10, and upper and lower outer hinge bars 23 and 25 positioned outside the case 10.

For the inner hinge slider 21, at the inside of the case 10, the upper side is slidably connected to the upper rail RL1 through the upper slider SD1, and the lower side is slidably connected to the lower rail RL2 through the lower slider SD2.

The upper and lower outer hinge bars 23 and 25 are integrally connected to the inner hinge slider 21 at the outside of outer case 11 through the upper and lower guide slots SL1 and SL2, respectively, and the front is hinge-connected to the door hinge bracket 3 through the hinge shaft 5.

That is, the upper outer hinge bar 23 is integrally connected to the upper one side of the inner hinge slider 21 at the outside of the outer case 11 through the upper guide slot SL1 formed on the upper exterior surface of the outer case 11.

The lower outer hinge bar 25 is integrally connected to the lower one side of the inner hinge slider 21 at the outside of the outer case 11 through the lower guide slot SL2 formed under the exterior surface of the outer case 11.

In addition, a guide hole 27 is formed in the lower outer hinge bar 25 along the length direction.

Also, the door hinge bracket 3 is composed of the upper door hinge bracket 3a and the lower door hinge bracket 3b.

That is, the upper door hinge bracket 3a is fixed to the upper side of one end of the door DR and is hinged to the front of the upper outer hinge bar 23 through the hinge shaft 5 (e.g., a first hinge shaft 5).

In addition, the lower door hinge bracket 3b is fixed to the lower side of one end of the door DR and is hinged to the front of the lower outer hinge bar 25 through the hinge shaft 5 (e.g., a second hinge shaft 5).

The striker 30 is fixedly installed on one side of the inner case 13 on the inside between the outer and inner cases 11 and 13.

Here, the striker 30 may be formed in a rod shape and may be fixed to a flange 13a protruded to the inner case 13.

The striker 30 is positioned so that the hinge slider 20 is constrained to the slide latch part 50 while sliding and moving in the outer diagonal direction of the vehicle body.

The slide latch part 50 is installed on the lower one side of the inner hinge slider 21 at the inside between the outer and inner cases 11 and 13.

This slide latch part 50 operates to restrains the striker 30 or release the restraint through a claw lever 51 and a pawl lever 53 at the position where the hinge slider 20 slides and moves in the diagonal direction outside the vehicle body.

That is, the slide latch part 50 includes the first, second, and third shafts S51, S53, and S55, the claw lever 51, the pawl lever 53, and the claw damper 55.

The first, second, and third shafts S51, S53, and S55 are installed between the fixing plate 57 formed on the lower one side of the inner hinge slider 21 and the bottom part protruding from the inner hinge slider 21.

Here, the first, second, and third shafts S51, S53, and S55 are installed adjacent to each other.

The claw lever 51 is rotatably installed on the first shaft S51. In addition, the claw lever 51 has a restraining groove 61 for restraining the striker 30 on one side, and a support surface 63 for limiting one direction rotation on the other side.

The pawl lever 53 is rotatably installed on the second shaft S53 corresponding to one side direction of the claw lever 51. In addition, the pawl lever 53 has a supporting end 65 acting on the supporting surface 63 on one side, and an operating end 67 protruding from the other side.

The claw damper 55 is installed on the third shaft S55 to limit one direction rotation of the claw lever 51 and supports one surface of the claw lever 51 to reduce a contact noise while suppressing one direction rotation.

Also, the slide latch part 50 further includes a claw spring 71, and a pawl spring 73.

The claw spring 71 is inserted into the first shaft S51 and installed to elastically support the claw lever 51 in the rotating direction to release the restraint of the striker 30.

In addition, the pawl spring 73 is inserted into the second shaft S53 and installed to elastically support the pawl lever 53 in the rotating direction in which the supporting end 65 supports the supporting surface 63 of the claw lever 51.

Also, in the link arm 40, one end is hinged and connected to the front of the lower door hinge bracket 3b through a hinge pin 43, and a pawl rod 41 guided along the guide hole 27 formed in the lower outer hinge bar 25 and acting on the operating end 67 of the pawl lever 53 is installed at the front end.

That is, the pawl rod 41 is connected to the lower door hinge bracket 3b through the link arm 40 and acts on the operating end 67 of the pawl lever 53 according to the opening/closing operation of the door DR, so that the pawl lever 53 may fix or release the rotation of the claw lever 51.

Hereinafter, the detailed operation of the door hinge device for the vehicle according to an embodiment of the present disclosure is described with reference to FIG. 9 to FIG. 11.

Figure 9:
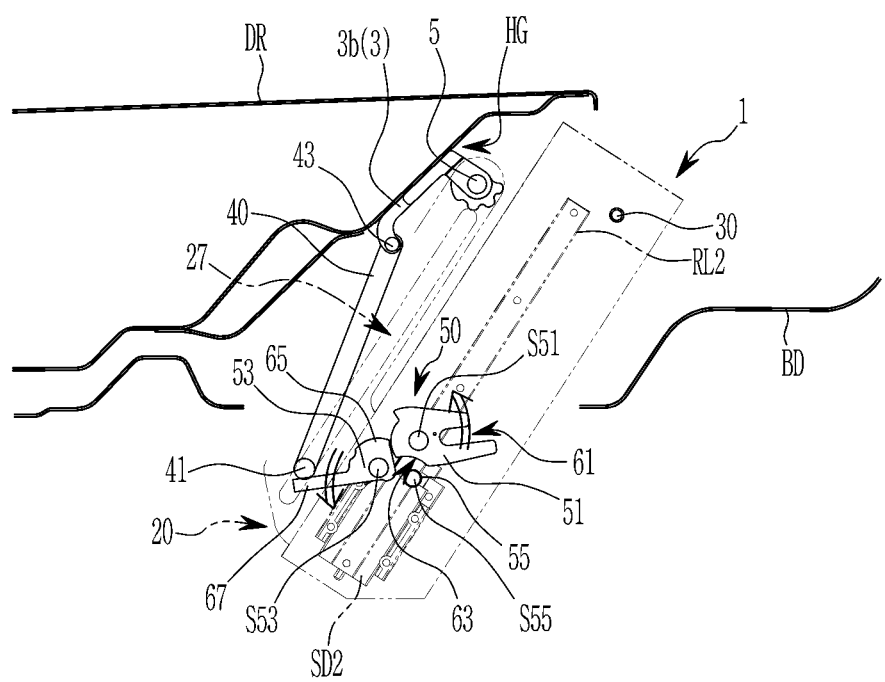
FIG. 9 to FIG. 11 are flat cross-sectional views showing a step-by-step operation state of a door hinge device for a vehicle according to an embodiment of the present disclosure.
Figure 10:
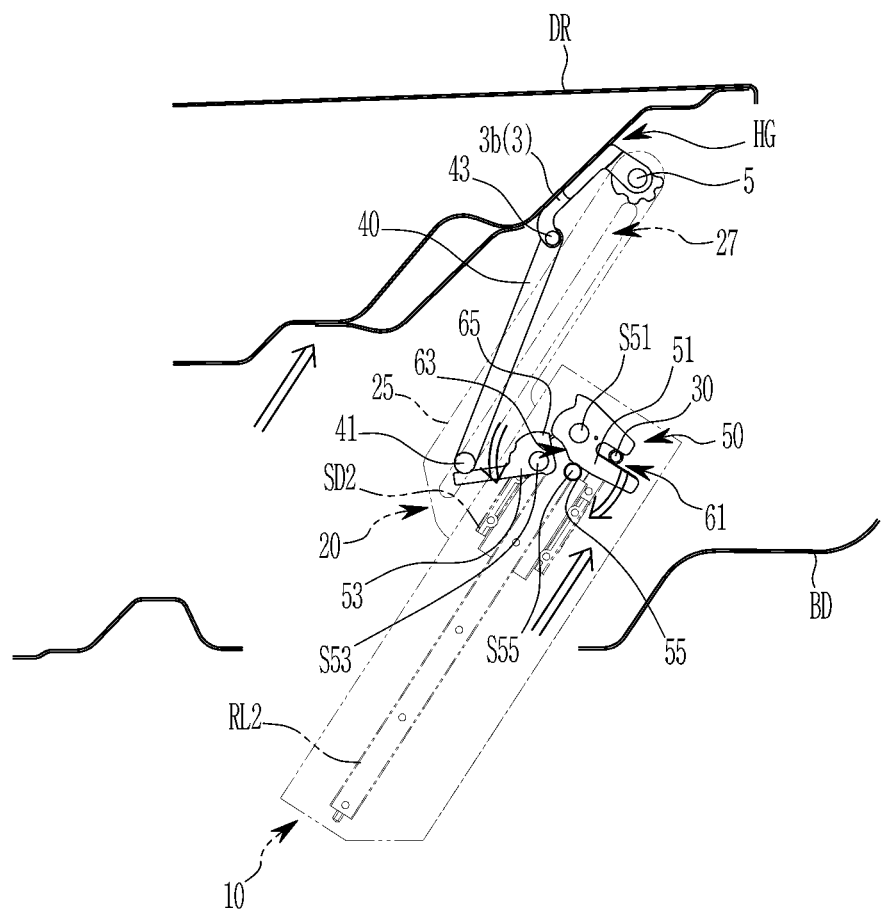
Figure 11:
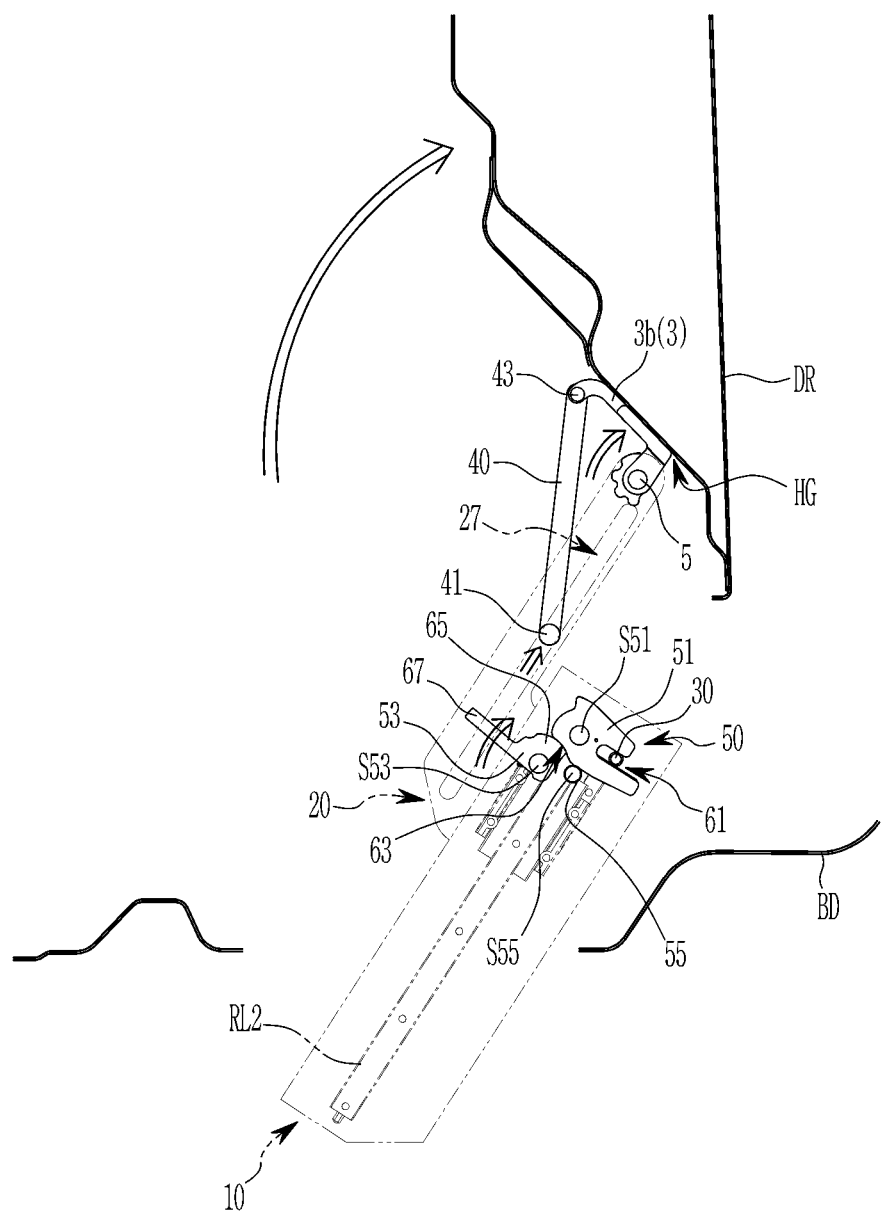

FIG. 9 to FIG. 11 are flat cross-sectional views showing a step-by-step operation state of a door hinge device for a vehicle according to an embodiment of the present disclosure.

First, referring to FIG. 9, the door DR is a closed state.

At this time, while the hinge shaft 5 connecting the door DR and the vehicle body BD is moved in the diagonal direction inside the vehicle body BD together with the hinge slider 20, the hinge part HG of the door DR is a position in which the door DR maintains the closed state.

At this time, the slide latch part 50 maintains the state that the pawl rod 41 pushes the operating end 67 of the pawl lever 53 so that the supporting end 65 is separated from the supporting surface 63 of the claw lever 51, and the claw lever 51 is rotated by the claw spring 71 so that the restraining groove 61 of the claw lever 51 becomes an opened state at an angle that the striker 30 may enter.

Referring to FIG. 10, as above-described, in the state that the door DR is closed, when the user performs a sliding operation to open the door DR, the hinge part HG of the door DR moves in the outer diagonal direction of the vehicle body BD.

Then, the hinge slider 20 connected to the door hinge bracket 3 through the hinge shaft 5 (hinge shafts) slides and moves along the upper and lower rails RL1 and RL2 in the outer diagonal direction of the vehicle body BD.

Also, while the striker 30 pushes and rotates one side of the restraining groove 61 of the claw lever 51, the slide latch part 50 is restrained by the restraining groove 61. At this time, the pawl rod 41 is in the state of pushing the operating end 67 of the pawl lever 53 and maintains the state that the supporting end 65 of the pawl lever 53 is separated from the supporting surface 63 of the claw lever 51.

Referring to FIG. 11, as above-descried, after the slide operation of the door DR is completed, the user performs a swing operation to open the door DR.

Then, the door DR rotates the hinge shaft 5 to the rotation center.

At this time, the pawl rod 41 connected to the lower door hinge bracket 3b through the link arm 40 moves in the diagonal direction outside the vehicle body along the guide hole 27, and then the slide latch part 50 is separated from the operating end 67 of the pawl lever 53.

Then, while the pawl lever 53 is rotated by the pawl spring 73, the supporting end 65 matches the supporting surface 63 of the claw lever 51 and fixes the claw lever 51 so as to not be rotated.

Therefore, the striker 30 remains restrained in the restraining groove 61 of the claw lever 51, and the positioned of the door DR is fixed in the state that the hinge part HG with the vehicle body BD slides and moves in the outer diagonal direction of the vehicle body BD so that the rotation trajectory is secured without interference with the vehicle body BD or other door DR, and the swing operation of the door DR by the user may be stably achieved.

Here, the pawl rod 41 is connected to the lower door hinge bracket 3b through the link arm 40 and pushes the operating end 67 of the pawl lever 53 from the position where the door DR is closed to the position where the slide movement is completed so that the supporting end 65 is separated from the supporting surface 63 of the claw lever 51.

In addition, as the door DR starts the swing operation at the slide movement completion position, the pawl rod 41 moves in the outer diagonal direction of the vehicle body along the guide hole 27 by the link arm 40 and is separated from the operating end 67 of the pawl lever 53, and as the pawl lever 53 is rotated by the pawl spring 73, the supporting end 65 matches the supporting surface 63 of the claw lever 51 to fix the claw lever 51 in the rotating direction.

On the other hand, when the door DR is closed again from the completely open state of the door DR as described above, the door DR is closed through the swing operation and the slide movement operation in the rotation center of the hinge shaft 5.

Here, closing the door DR is opposite to the opening and is performed by operating the swinging, and then sliding the door DR in the inner diagonal direction of the vehicle body BD again.

At this time, in order to completely close the door DR, the state in which the striker 30 is restrained from the restraining groove 61 of the claw lever 51 must be released before moving the slide.

To this end, in the process of the swing operation in the direction in which door DR is closed, referring to FIG. 10, the pawl rod 41 moves along the guide hole 27 in the inner diagonal direction of the vehicle body and pushes the operating end 67 of the pawl lever 53 to rotate the pawl lever 53.

Then, the pawl lever 53 releases the supporting state of the claw lever 51 as the supporting end 65 of the claw lever 51 is separated from the supporting surface 63 of the claw lever 51.

In this state, the claw lever 51 is in a rotatable state, but as the state that the door DR is in before the slide movement, the striker 30 maintains the restrained position in the restraining groove 61 of the claw lever 51 according to the position of the door DR.

Then, when the user slides the door DR in the inner diagonal direction of the vehicle body BD, the hinge slider 20 moves in the inner diagonal direction of the vehicle body BD along the upper rail RL1 and the lower rail RL2, and the striker 30 is separated from the restraining groove 61 of the claw lever 51, and the door DR is closed.

Accordingly, in the door hinge device for the vehicle 1 according to an embodiment of the present disclosure, in the state without the B pillar, as the hinge slider 20 connected to the hinge part HG of the door DR slides and moves in the outer diagonal direction of the vehicle body BD along the upper and lower rails RL1 and RL2 inside the case 10 to secure the rotation trajectory of the door DR, it is possible to simultaneously open/close both doors DR or independently open/close only one door DR.

At this time, the slide latch part 50 fixed to the hinge slider 20 restrains the striker 30 fixed to the case 10 by the linked operation of the link arm 40 connected to the door hinge bracket 3, thereby fixing the slide movement position of the hinge slider 20, and accordingly, the opening/closing operation of the door may be stably achieved.

In addition, since the user manually opens and closes the door DR without a separate driving unit using a motor, it is possible to enable the door opening/closing operation even when the battery is discharged.

In addition, the door hinge device for the vehicle 1 according to an embodiment of the present disclosure uses a driving unit such as a conventional motor or is slim compared to a gooseneck type of hinge device, and does not require a free space according to the operation radius, thereby there is also an advantage in the vehicle body layout configuration.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A door hinge device for a vehicle including a case installed on one side of a vehicle body corresponding to one end of a door in an outer diagonal direction toward the outside of the vehicle body, a rail configured in a length direction on upper and lower sides of the case, respectively, and a hinge slider connected through hinge shafts to a door hinge bracket fixed to the one end of the door in a slidably installed state along the rail inside the case, comprising:
   a striker installed on one side of the inside of the case;
   a slide latch part installed on one side of the hinge slider inside the case and constraining or releasing the striker through a claw lever and a pawl lever at a position where the hinge slider slides in the outer diagonal direction of the vehicle body; and
   a link arm having one end hingedly connected to the door hinge bracket and a pawl rod being guided along a guide hole formed in the hinge slider at an end of the link arm to act on the pawl lever.

2. The door hinge device for the vehicle of claim 1, wherein
   the door is a front door or a rear door and the one end of the door is formed of a front end of the front door or a rear end of the rear door.

3. The door hinge device for the vehicle of claim 1, wherein
   the case includes an inner case facing inside of the vehicle and an outer case facing outside of the vehicle, the striker is fixed to one side of the inner case inside the case so that the hinge slider slides in the outer diagonal direction of the vehicle body and is constrained to the claw lever.

4. The door hinge device for the vehicle of claim 1, wherein
   the slide latch part includes:
   first, second, and third shafts installed between a fixing plate formed on the hinge slider and a bottom part protruding from the hinge slider;
   the claw lever including a restraining groove formed for restraining the striker on one side of the claw lever and a supporting surface formed for limiting one direction rotation on the other side of the claw lever, and rotatably installed on the first shaft;
   the pawl lever including a supporting end on one side thereof acting on the supporting surface and an operating end protruding from the other side and rotatably installed on the second shaft corresponding to one side direction of the claw lever, the operating end acted by the pawl rod of the link arm; and
   a claw damper installed on the third shaft corresponding to the other side of the claw lever to limit one direction rotation of the claw lever.

5. The door hinge device for the vehicle of claim 4, wherein
   the slide latch part further includes:

a claw spring inserted into the first shaft and elastically supporting the claw lever in a rotating direction to release the striker; and a pawl spring inserted into the second shaft and elastically supporting the pawl lever in a rotating direction where the supporting end of the pawl lever supports the supporting surface of the claw lever.

6. The door hinge device for the vehicle of claim 1, wherein the hinge slider includes:

an inner hinge slider of which upper and lower sides are slidably connected along the rail through an upper slider and a lower slider inside the case, respectively, and the slide latch part is installed on the lower side of the inner hinge slider;

an upper outer hinge bar integrally connected to the upper side of the inner hinge slider through an upper guide slot formed on an exterior surface of the case outside the case; and a lower outer hinge bar integrally connected to the lower side of the inner hinge slider through a lower guide slot formed on the exterior surface of the case outside the case, and including a guide hole guiding the pawl rod along a length direction.

7. The door hinge device for the vehicle of claim 6, wherein the door hinge bracket includes:

an upper door hinge bracket fixed to an upper side of the one end of the door and hinge-connected to a front of the upper outer hinge bar through a first hinge shaft of the hinge shafts; and a lower door hinge bracket fixed to a lower side of the one end of the door and hinge-connected to a front of the lower outer hinge bar through a second hinge shaft of the hinge shafts.

8. The door hinge device for the vehicle of claim 7, wherein the link arm is disposed under the lower outer hinge bar, the one end of the link arm is hinge-connected to a front of the lower door hinge bracket, and the link arm includes a front end to which the pawl rod is slidably installed along the guide hole.

\* \* \* \* \*